United States Patent [19]

Schildkraut et al.

[11] Patent Number: 5,075,796
[45] Date of Patent: * Dec. 24, 1991

[54] OPTICAL ARTICLE FOR MULTICOLOR IMAGING

[75] Inventors: Jay S. Schildkraut, Rochester, N.Y.; Christopher B. Rider, Mitcham, United Kingdom; Michael Scozzafava, Rochester, N.Y.

[73] Assignee: Eastman Kodak Company, Rochester, N.Y.

[*] Notice: The portion of the term of this patent subsequent to Nov. 20, 2007 has been disclaimed.

[21] Appl. No.: 583,620

[22] Filed: Sep. 17, 1990

[30] Foreign Application Priority Data

May 31, 1990 [GB] United Kingdom ................ 9012099

[51] Int. Cl.$^5$ .................... G02B 1/08; G02F 1/035
[52] U.S. Cl. .................................. 359/247; 252/583; 359/269; 359/332; 385/8; 385/122
[58] Field of Search ................ 350/96.34, 384, 390, 350/96.14, 385, 398, 166; 307/425, 430; 252/583

[56] References Cited

U.S. PATENT DOCUMENTS

| | | | |
|---|---|---|---|
| 4,249,796 | 2/1981 | Sincerbox et al. | 350/370 |
| 4,451,123 | 5/1984 | McNeill et al. | 350/386 |
| 4,886,339 | 12/1989 | Scozzafava et al. | 350/96.34 |
| 4,946,235 | 8/1990 | Scozzafava et al. | 350/96.34 |
| 4,948,225 | 8/1990 | Rider et al. | 350/96.34 |
| 4,971,426 | 11/1990 | Schildkraut et al. | 350/96.34 |

OTHER PUBLICATIONS

Sarid, "Long—Range Plasmon Waves on Very Thin Metal Films", Phys. Rev. Lett., vol. 47, No. 26, pp. 1927–1930 (1981).
Yang et al, "Long—Range Surface Modes of Metal—Clad Four—Layer Waveguides", Applied Optics, vol. 25, No. 21, pp. 3903–3908 (1986).
Plumereau et al, "Electrooptic Light Modulator Using Long—Range Surface Plasmons", SPIE, vol. 800, Novel Optoelectronic Devices, pp. 79–83 (1987).
Persegol et al, "A Novel Type of Light Modulator", SPIE vol. 864, Advanced Optoelectronic Technology, pp. 42–44 (1987).
Schildkraut, "Long Range Surface Plasmon Electrooptic Modulator", Applied Physics, vol. 27, No. 21, Nov. 1, 1988, pp. 4587–4590.
Yeatman et al, "Surface Plasmon Spatial Light Modulators", SPIE, vol. 1151, Optical Information Processing Systems and Architecture, pp. 522–532 (1989).

Primary Examiner—Bruce Y. Arnold
Assistant Examiner—Martin Lerner
Attorney, Agent, or Firm—Carl O. Thomas

[57] ABSTRACT

An optical article capable of modulating the reflection of polarized monochromatic electromagnetic radiation is disclosed comprising a reflective metal layer having a thickness of less than 0.5 $\mu$m, means acting as a support for directing polarized electromagnetic radiation to the reflective metal layer, a dielectric layer interposed between the support and the reflective metal layer having a refractive index less than that of the support and a thickness in the range of from 0.1 to 10 times the wavelength of electromagnetic radiation directed toward the reflective metal layer, an electrooptic medium that exhibits a refractive index which is a function of an applied electrical potential, and a counter electrode. The optical article is characterized in that it is capable of modulating the reflection of polarized monochromatic electromagnetic radiation from differing wavelength sources to produce a multicolor image. To this end, the reflective metal layer is divided into a plurality of electrically isolated zones each intended to be addressed by electromagnetic radiation from a different wavelength source, the dielectric layer exhibits a different thickness adjacent each of the zones, the counter electrode is divided into electrically isolated zones, and the article additionally includes means for focusing reflected polarized electromagnetic radiation from each of the zones on a common target area. The invention particularly lends itself to producing multicolor images in photographic elements.

26 Claims, 2 Drawing Sheets

OPTICAL ARTICLE FOR MULTICOLOR IMAGING

FIELD OF THE INVENTION

The invention relates to optical articles for the reflective modulation of electromagnetic radiation.

BACKGROUND OF THE INVENTION

In the last decade physicists have observed that when polarized electromagnetic radiation of a selected wavelength is coupled to the surface of a thin metal layer forming an interface with a dielectric medium a portion of the electromagnetic radiation is reflected while an evanescent portion of the electromagnetic radiation (referred to as a surface plasma wave or surface plasmon or by the acronym SP) is propagated along the interface of the metal and dielectric medium.

In some instances an electrooptic dielectric medium has been employed. With a properly selected angle of incidence it is possible by electrically varying the refractive index of the electrooptic medium to vary the proportion of incident electromagnetic radiation that is reflected or internally propagated as surface plasmons. When the metal layer is positioned between the electrooptic medium and a dielectric layer, the thicknesses of the dielectric and metal layers are selected as a function of the wavelength of the electromagnetic radiation, and the indices of refraction of the dielectric layer and electrooptic medium match at least approximately, it is possible to increase the internal propagation sensitivity of the device to differences in electrical biasing of the electrooptic medium efficiency by coupling the evanescent portion of the incident electromagnetic radiation at the two interfaces of the metal layer into an antisymmetric mode, referred to as a long range surface plasmon (LRSP). When efficient long range surface plasmon coupling is achieved, possible within only a narrow range of electrical biasing, a very low proportion of incident electromagnetic radiation is reflected. A long range surface plasmon device can be modulated similarly to a surface plasmon device, but with higher variations in reflected electromagnetic radiation being realizable for a given variance in applied voltage.

Despite a consensus on the physics of operation, actual surface plasmon devices and, particularly, long range surface plasmon devices, which place even more stringent requirements device construction, have been disclosed in forms that demonstrate theoretical feasibility, but fall well short of being practically attractive to construct and use.

Sincerbox et al U.S. Pat. No. 4,249,796, issued Feb. 10, 1981, is illustrative. Sincerbox's best mode of constructing a surface plasmon modulator is to optically couple a LaSF$_5$ prism (refractive index, n=1.88) to a sapphire plate (n=1.77) through an index matching liquid. A silver layer having a thickness of 300 to 500 Å serves as the reflective metal layer. An aqueous solution of 0.3M KBr and 0.0113M heptylviologen bromide completes a conductive bridge to a counter electrode. Notice that the sapphire plate serves as the support for the silver layer and that two separate liquid couplings are required to complete the device. It should be further noted that Sincerbox contains no suggestion of a long range surface plasmon modulator.

Sarid, "Long-Range Plasmon Waves on Very Thin Metal Films", Phys. Rev. Lett., Vol. 47, No. 26, pp. 1927-1930 (1981), describes long range surface plasmon propagation in a theoretical manner, but offers no suggestion as to how such a device could be constructed.

McNeill et al U.S. Pat. No. 4,451,123, issued May 29, 1984, discloses a device similar to that of Sincerbox et al, but differing in the variable refractive index medium employed. For this purpose McNeill et al employs a doped semiconductor capable of forming a rectifying junction with the metal film. The device operates in a bistable switching mode. In the absence of an applied electrical bias across the semiconductor the device is "on", meaning that incident collimated electromagnetic radiation striking the base of the prism is reflected. When an electrical bais is applied, the refractive index of the semiconductor adjacent its interface with the metal film is altered, resulting in surface plasmon generation at the interface, which reduces reflected radiation and turns the device "off". The surface plasmon device is either "on" or "off", has no image forming capability, and does not lend itself to conversion to a long range surface plasmon device.

Yang et al, "Long-Range Surface Modes of Metal-Clad Four-Layer Waveguides", Applied Optics, Vol. 25, No. 21, pp. 3903-3908 (1986), is cumulative with Sarid in its theoretical discussion of long range surface plasmons, but goes somewhat further in reporting an actual device construction. A silver film of from 100 to 250 Å in thickness was evaporated on a "Ag$^+$ exchanged glass waveguide" not otherwise identified. A prism made of ZF7 glass ($n_p=1.7997$) was coupled to the silver layer through an index matching liquid composed of naphthalene bromide and coal oil. Modulation was achieved by squeezing the device to change the thickness of the liquid layer.

Plumereau et al, "Electrooptic Light Modulator Using Long-Range Surface Plasmons", SPIE, Vol. 800, Novel Optoelectronic Devices, pp. 79-83 (1987), is cumulative with Sarid and Yang et al in its theoretical discussion of long range surface plasmons, but provides in FIG. 1 a sketch of a constructed device consisting of a TiO$_2$ prism (1), an Ag layer (2), a CuCl layer (3), an Ag layer (4) and a CuCl layer (5). Modulation is achieved by appling a voltage between (2) and (4). Few clues as to actual device construction are provided beyond the indication that the electrooptic CuCl layer was monocrystalline with a [111] crystallographic orientation. It was suggested that zinc oxide could be used in place of CuCl as an electrooptic material. A very narrow angular range of $<10^{-2}$ degrees produced the resonance required for long range surface plasmon generation.

Persegol et al, "A Novel Type of Light Modulator", SPIE Vol. 864, Advanced Optoelectronic Technology, pp. 42-44 (1987), discloses in FIG. 1 a silicon support having a 2000 Å silica layer which is in turn coated with a 6930 Å zinc oxide layer, coated with a 95 Å gold layer. The device is completed by mounting a prism spaced from the gold layer by an air gap. Modulation is achieved by placing an electrical bias between the gold layer and the silicon substrate.

Schildkraut, "Long Range Surface Plasmon Electrooptic Modulator", Applied Physics, Vol. 27, No. 21, Nov. 1, 1988, pp. 4587-4590, discloses in FIG. 1 a long range surface plasmon generator. Schildkraut reports no actual device construction, but basis calculations on the assumption that electrooptic film is modeled as a noncentrosymmetric organic film having a $\chi^{(2)}zzz=2\times10^{-7}$ esu.

Yeatman et al, "Surface Plasmon Spatial Light Modulators", SPIE, Vol. 1151, Optical Information Processing Systems and Architecture, pp. 522-532 (1989), suggests the use of a surface plasmon device as a spatial light modulator (SLM). In a broad theoretical sense this is achieved merely by segmenting the counter electrode so that each segment can be separately biased for imaging purposes. In an experimental construction, shown in FIG. 5, a silver layer is coated on the base of high index prism and glass slide and a liquid crystal composition is confined between the silver layer and a counter electrode with thin magnesium fluoride alignment layers being interposed. The counter electrode is divided into segments. A Mylar TM spacer of from 6 to 10 μm in thickness is glued between the counter electrode and silver layer to confine the liquid crystal composition. Yeatman et al suggests alternatively employing a semiconductor depletion region or a Langmuir-Blodgett (LB) film as a replacement for the liquid crystal electrooptic medium, contemplated constructions of each being shown in FIGS. 8 and 9, respectively. Yeatman et al does not address the construction of long range surface plasmon spatial light modulators.

RELATED PATENT APPLICATIONS

Schildkraut et al OPTICAL ARTICLE FOR REFLECTION MODULATION U.S. Ser. No. 419,817, filed Oct. 11, 1989, now U.S. Pat. No. 4,971,426 commonly assigned, discloses a long range surface plasmon device in which the electrooptic medium is exhibits a second order polarization susceptibility of greater than $10^{-9}$ esu and the dielectric layer is comprised of a metal oxide or fluoride or a low molecular weight aromatic compound.

Rider et al HIGH $\chi^{(2)}$ OPTICAL ARTICLE U.S. Ser. No. 419,984, filed Oct. 11, 1989, now U.S. Pat. No. 4,948,225, commonly assigned, discloses a long range surface plasmon device in which a metal fluoride and oxide layer of a thickness of less than 0.1 μm between the reflective metal layer and the electrooptic medium, the reflective metal layer is a moderate work function metal, and the electrooptic medium is a poled polymeric medium having a glass transition temperature of at least 50° C.

Scozzafava et al HIGH $\chi^{(2)}$ OPTICAL ARTICLE WITH IMPROVED BUFFER LAYER U.S. Ser. No. 419,819, filed Oct. 11, 1989, now U.S. Pat. No. 4,955,977 commonly assigned, discloses an optical article with a high $\chi^{(2)}$ poled polymeric medium formed on a buffer layer comprised of low molecular weight aromatic compound and a metal fluoride or oxide.

Scozzafava et al AN IMPROVED NONLINEAR OPTICAL DEVICE, U.S. Ser. No. 419,818, filed Oct. 11, 1989, commonly assigned, now U.S. Pat. No. 4,946,235, discloses an optical article containing an organic layer for the nonlinear propagation of electromagnetic radiation and a buffer layer overlying the organic layer comprised of a low molecular weight aromatic compound.

Schildkraut et al OPTICAL ARTICLE FOR REFLECTION MODULATION, U.S. Ser. No. 583,638, filed concurrently herewith and commonly assigned, discloses an optical article capable of producing an image by reason of having at least one of its reflective metal layer and counter electrode divided into segments that can be independently electrically biased to locally control reflection and attenuation of a polarized coherent beam of electromagnetic radiation.

SUMMARY OF THE INVENTION

The present invention makes available to the art for the first time an optical article which relies upon the selective internal propagation of polarized monochromatic electromagnetic radiation from a plurality of wavelength sources to produce multicolor images. The devices of this invention offer the particular advantage in that they can be constructed in practically useful forms. The devices contain no liquid components. It is unnecessary for the user to be concerned with maintaining a liquid or air spacing between components to achieve sought after performance. The device employs a single support element on which all other elements can be formed as solid layers. All of the materials employed to form layers of the device can be conveniently formed in their required thicknesses.

In one aspect this invention is directed to an optical article capable of modulating the reflection of polarized monochromatic electromagnetic radiation comprising a reflective metal layer having a thickness of less than 0.5 μm, means acting as a support for directing polarized electromagnetic radiation to the reflective metal layer, a dielectric layer interposed between the support and the reflective metal layer having a refractive index less than that of the support and a thickness in the range of from 0.1 to 10 times the wavelength of electromagnetic radiation directed toward the reflective metal layer, an electrooptic medium that exhibits a refractive index which is a function of an applied electrical potential, and a counter electrode.

The optical article is characterized in that, to modulate the reflection of polarized monochromatic electromagnetic radiation from differing wavelength sources to produce a multicolor image, the reflective metal layer is divided into a plurality of electrically isolated zones each intended to be addressed by electromagnetic radiation from one of the different wavelength sources, the dielectric layer exhibits a different thickness adjacent each of the zones, the dielectric layer thicknesses adjacent the zones being proportional to the relative wavelengths of the electromagnetic radiation from the sources intended to address each zone, the electrooptic medium is a polymeric layer coated on the reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety, the polymeric layer exhibits a refractive index which differs from that of the dielectric layer by less than 20 percent in the absence of an applied electrical potential, the counter electrode is divided into electrically isolated zones, and the article additionally includes means for focusing reflected polarized electromagnetic radiation from each of the zones on a common target area.

In another aspect, this invention is directed to a process of producing a multicolor image comprising providing a photographic element capable of producing superimposed yellow, magenta and cyan dye images as a function of exposure to electromagnetic radiation in first, second and third wavelength regions, respectively, of the electromagnetic spectrum and imagewise exposing the photographic element to electromagnetic radiation of the first, second and third wavelengths.

The process is characterized by the steps of (a) directing polarized monochromatic electromagnetic radiation of the first, second and third wavelengths to first, second and third zones of the article described above with an electrical potential applied within each zone capable of modulating reflection from that zone, (b) reflecting the electromagnetic radiation of the first, second and third wavelengths from the zones of the article to a common area of the photographic element, and (c) repeating steps (a) and (b) with the potentials applied being independently adjusted during each iteration and the electromagnetic radiation being directed to a different area of the photographic element.

DESCRIPTION OF PREFERRED EMBODIMENTS

Figure 1:
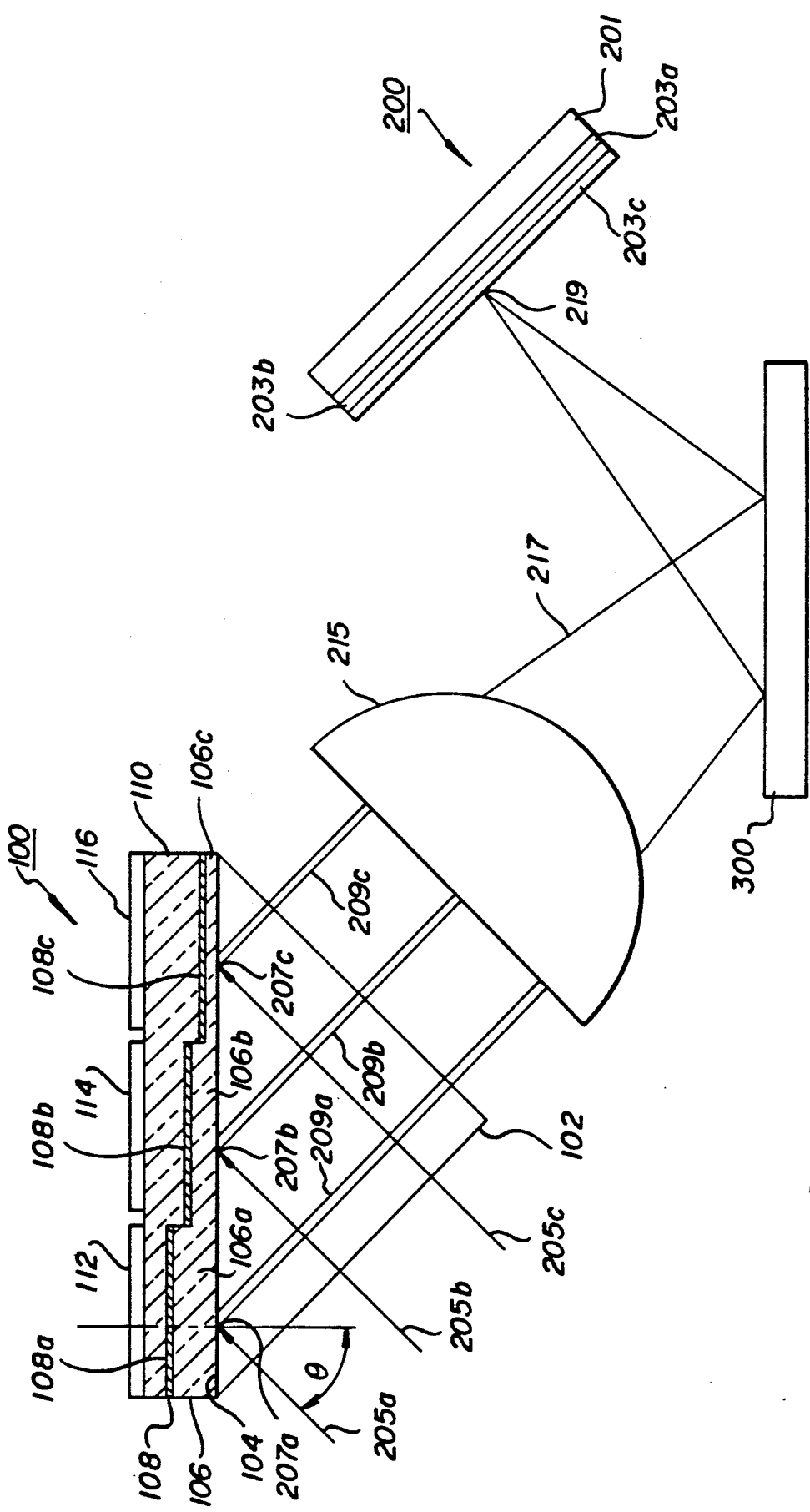
FIG. 1 is an elevation, partly in section, of a modulator according to the invention in combination with lenses, a mirror and a photographic element.

Referring to FIG. 1, a modulator 100 is shown consisting of a prism 102, which serves a support for the device. On the base 104 of the prism is located a dielectric layer 106 having a lower index of refraction than the prism. The dielectric layer is divided into a plurality of different zones, illustrated in terms of three zones 106a, 106b, and 106c, each having a different thickness. A reflective metal layer 108 is divided into a plurality of electrically isolated zones shown as 108a, 108b and 108c. Overlying the reflective metal layer is an electrooptic medium 110 in the form of a polymeric layer. Overlying the electrooptic medium is a counter electrode divided into a plurality of electrically isolated zones shown as counter electrode zones 112, 114 and 116.

Figure 2:
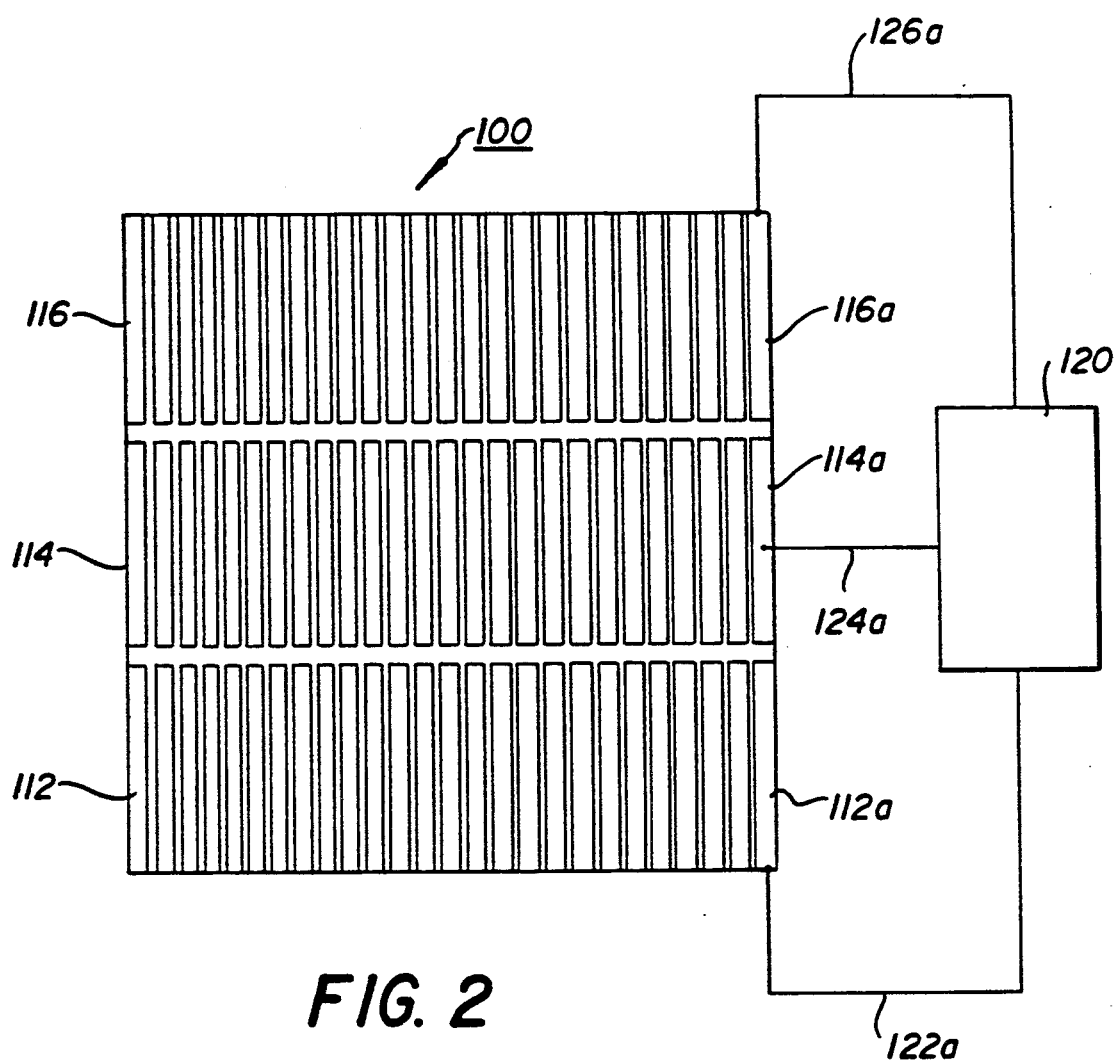
FIG. 2 is a plan view of the modulator schematically showing the electrical attachment of one counter electrode segment in each of three zones to an imaging controller.

Referring to FIG. 2, it can be seen that in a preferred form of the invention each counter electrode zone is in turn divided into a plurality of segments. Segments 112a, 114a and 116a are each representative of the segments within the corresponding zone. In FIG. 2 the representative segments 112a, 114a and 116a are electrically attached through electrical conduction paths 122a, 124a and 126a to a schematically shown imaging controller 120.

Figure 3:
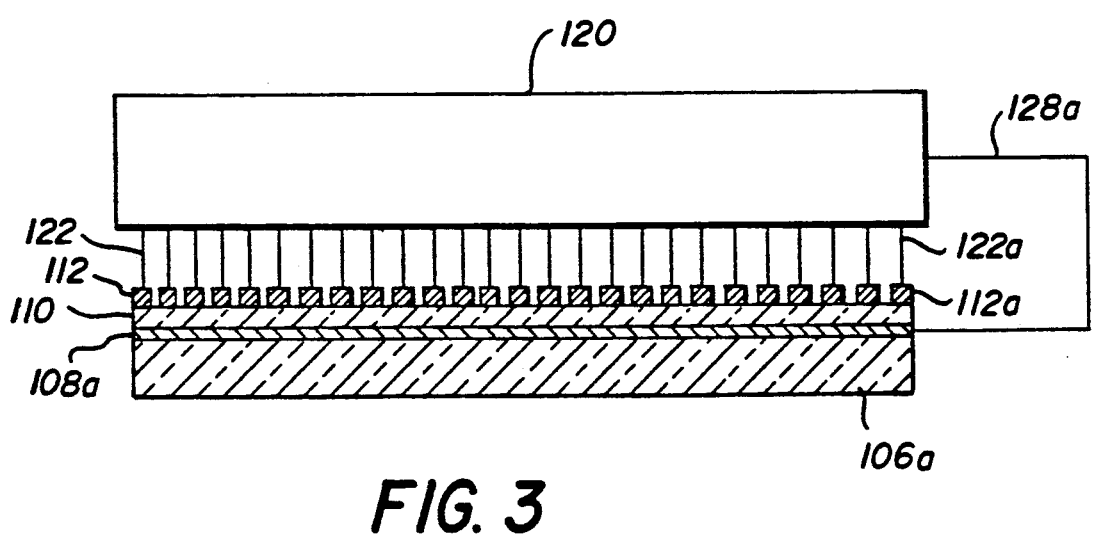
FIG. 3 is a sectional view of the modulator schmatically showing the electrical attachment of one zone of the modulator to the imaging controller.

Identical electrical conduction paths are provided between the imaging controller and each of the segments in each zone. This is shown in FIG. 3, which shows all of the electrical connections between the imaging controller and one of the zones of the modulator. The zone 108a of the reflective metal layer is connected to the imaging controller 120 through electrical conduction path 128a. Each segment of the counter electrode zone 112 is connected to the imaging controller through a separate electrical conduction path 122. The electrical conduction path 122a to the segment 112a is representative. Each of the two remaining zones have identical electrical connections to the imaging controller.

Within each zone, by selectively controlling the potential difference between the metal reflective layer and each of the individual segments of the counter electrode it is possible to bias the modulator so that in selected segment areas the modulator exhibits maximum reflection of polarized monochromatic electromagnetic radiation directed toward it and in other selected segment areas the modulator exhibits minimum reflection of that same radiation. By using just maximum and minimum reflection biasing it is possible to produce half tone images. It is also possible to modulate reflection intensity over the full range from maximum to minimum reflection to produce continuous tone images. By independently addressing two or more of the zones concurrently it is possible to produce multicolor images.

Use can be illustrated by considering the exposure of a photographic element 200, comprised of a support 201 and three superimposed image recording portions 203a, 203b and 203c, each capable of recording electromagnetic radiation of a different wavelength, coated on the support, by reflections from the modulator in areas controlled by representative counter electrode segments 112a, 114a and 116a. As shown in FIG. 1 the modulator is addressed by a beam of polarized monochromatic electromagnetic radiation indicated by arrow 205a directed at a point of incidence 207a with the dielectric layer in zone 106a in an area of the modulator underlying representative counter electrode segment 112a. The beam forms an angle of incidence $\theta$ measured from an axis normal to the dielectric layer. The potential biasing supplied by the controller 120 to the zone 108a of the reflective metal layer through conduction path 128a and the counter electrode segment 112a through conduction path 122a is as shown intermediate between that required for either maximum or minimum reflection. A portion of the incident electromagnetic radiation is propagated within the modulator along the interfaces of the reflective metal layer as a long range surface plasmon or in the electrooptic medium as a guided mode. This occurs because the potential gradient applied by the counter electrode segment 112a has resulted in locally adjusting the refractive index of the electrooptic medium 110 to a level that permits coupling of the wavefronts at the opposite interfaces of the reflective metal layer.

When the potential difference is adjusted for optimum internal propagation, very little, if any, of the incident beam is reflected from the device. When the potential difference is adjusted to prevent internal propagation, the incident beam is specularly reflected from the device with no significant spreading.

With intermediate biasing, as shown, the reflected beam 209a is slightly spread in the direction of propagation within the device, since evanescent fractions of the electromagnetic radiation can emerge from the device at displacements of up to 100 μm from the point of incidence. However, the intensity of the reflected beam falls off sharply with its displacement from the point of incidence. No significant spreading of the incident beam normal to the longitudinal axis of the segment 112a occurs, since the beam lacks lateral propagation momentum. Hence, no significant lateral spreading of electromagnetic radiation between counter electrode segment areas occurs. In an similar manner polarized monochromatic beams 205b and 205c are directed to the zones 106b and 106c of the dielectric layer at points of incidence 207b and 207c, respectively, resulting in reflected beams 209b and 209c.

Each of the three beams 205a, 205b and 205c supplies polarized monochromatic electromagnetic radiation of a different wavelength. To allow the modulator to couple internally or reflect simultaneously and selectively beams of each of three different wavelengths it is necessary that the dielectric layer have three different thicknesses, a different thickness in each zone. The thicknesses of the dielectric layer in the three different zones are proportional to the relative wavelengths of the electromagnetic radiation. As shown, the zones distinguished by a, b and c reference numeral suffixes, referred to hereafter as the a, b and c zones, are constructed to allow electromagnetic radiation of the longest wavelength to be modulated by the a zone, intermediate wavelength to be modulated by the b zone, and the shortest wavelength to be modulated by the c zone. The zones can be identical, except for the thickness of the dielectric layer. If, for example, beams 205a, 205b and 205c represent wavelengths of 300 nm, 800 nm and 1300 nm, respectively, the ratios of the thicknesses of the dielectric layer in the a, b and c zones are

1300:800:300 or 4.3:2.7:1

Differing wavelengths for the three separate beams can be selected ranging from the near ultraviolet, typically including wavelengths as short as about 300 nm, through the visible region of the spectrum, and through the near infrared portion of the electromagnetic spectrum, typically through about 1.5 $\mu$m. Monochromatic sources of electromagnetic radiation can be provided by filtration, lasers or any other convenient conventional source.

To expose the photographic element 200 in a single area to all three of the beams 209a, 209b and 209c an integrating lens 215 is provided, which provides a combined beam 217.

While differing approaches for sequentially exposing different areas of the photographic element are possible, in the simplest and preferred scanning approach the beams 205a, 205b, and 205c are each laterally expanded lines that concurrently impinge on all of the segment areas within the a, b and c zones, respectively, of the modulator, but over only a narrow portion of each segment area. In this instance the integrating lens 215 is a hemicylindrical lens that transfers the integrated beam 217, representing a multicolor line exposure, to the mirror 300 and the photographic element 200 in one step. Between each successive laterally displaced line exposure of the photographic element, the biasing of the segments of the counter electrode in each zone are adjusted to permit selective internal propagation or reflection as required for imaging and the mirror 300 is reoriented. This approach offers the advantage that the input beams, modulator, lens and photographic element all remain in a fixed relative spatial relationship during imaging and the mirror alone requires physical manipulation.

In the preferred embodiment of the invention described above the counter electrode is segmented in each zone to permit line-by-line exposure of the photographic element. Instead of segmenting the counter electrode in each zone, it is possible to achieve exactly the same operation by providing instead a segmented reflective metal layer in each zone.

In still another variation neither the counter electrode zones nor the reflective metal layer zones are segmented. In this instance the modulator is intended to address a single point on the multicolor photographic element in a single exposure step. The integrating lens 215 in this instance focuses the beam 217 at a single point or spot on the photographic element. Mirror manipulation can move the location of the exposure spots on the surface of the photographic element to allow an image to be formed in the photographic element.

The multicolor photographic element 200 is chosen to be capable of separately recording each of the three monochromatic sources of electromagnetic radiation being received. As shown, three superimposed image recording layer portions 203a, 203b and 203c are provided. The image recording layer portions are each chosen to be responsive to a different one of the three wavelengths of electromagnetic radiation and to produce a dye image. In multicolor photography the customary practice is to employ three image recording layer portions capable of producing yellow, magenta and cyan dye images, directly or during subsequent processing. The wavelength of the electromagnetic radiation chosen for producing a dye image in any one of the recording layer portions can be selected independently of the hue of the dye image sought to be formed.

The angle at which each of the beams 205a, 205b and 205c strikes the dielectric layer 106 determines whether the modulator internally propagates the beam by generating long range surface plasmons or internally guided modes. At the highest angle of incidence $\theta$ that produces internal propagation internal long range surface plasmon propagation occurs. At lower values of $\theta$ internal guided mode propagation occurs. A choice of angles are available for achieving guided mode operation. Generally best results are achieved at the first (zero order) guided mode angle first encountered following the long range surface plasmon producing angle. Appropriate angles of incidence of the polarized monochromatic electromagnetic radiation can be calculated from known physical relationships. Optimum angles can also be readily determined simply by varying the angles of incidence and observing the optimum angles for modulation.

Although the prism 102 is shown as the support for the modulator, it is appreciated that the optical articles of this invention can be formed on any convenient conventional optical coupling element. For example, the prism can be replaced with an optical grating.

In one preferred form the dielectric layer can be a metal oxide or fluoride layer. Since oxygen and fluorine generally form relatively inert stable compounds with metals, it is apparent that the dielectric layer can be formed from a broad selection of metal fluorides and oxides. Alkaline earth oxides (particularly magnesia), rare earth oxides, alumina, and silica constitute preferred metal oxides for use in the practice of this invention. However, any stable metal oxide that can be readily deposited in an amorphous form can be employed. Alkali metal fluorides (e.g., lithium fluoride) and alkaline earth metal fluorides (e.g., calcium or magnesium fluoride) constitute preferred metal fluorides. Rare earth fluorides are also contemplated. Mixed metal oxides, mixed metal fluorides, and mixtures of metal fluorides and oxides are all contemplated. Mixtures offer the advantage of increasing steric disorder, thereby suppressing crystallization and preserving the desired amorphous nature of the coating.

Any conventional technique for depositing the metal fluoride or oxide layer compatible with the surface onto which deposition is intended can be undertaken. Vacuum vapor deposition, sputtering, chemical vapor deposition, molecular beam epitaxy, liquid phase epitaxy, electrolytic oxidative coating, and similar conventional coating processes can be employed. These deposition techniques lend themselves particularly to forming layers of less than 0.1 μm in thickness.

It is specifically contemplated to form metal fluoride coatings by the thermal decomposition of a metal carboxylate (e.g., a metal acetate or 2-ethylhexanoate) in the presence of fluorinating agent (e.g., heptafluorobutyric acid). This method is the subject matter of Paz-Pujalt U.S. Ser. No. 377,646, filed July 10, 1989, now allowed titled METHOD OF FORMING METAL FLUORIDE FILMS BY THE DECOMPOSITION OF METALLO-ORGANIC FILMS IN THE PRESENCE OF A FLUORINATING AGENT, commonly assigned.

Instead of forming the dielectric layer of a metal oxide or fluoride, in an alternative preferred form of the invention the dielectric layer is formed of one or more amorphous low molecular weight aromatic compounds.

By "amorphous" it is meant that there is substantially no crystallinity in the layer or microstructure attributed to the coating process. This can be determined by visual inspection under a microscope; by Raman spectroscopic techniques; or by the observation of scattered light from the modulator.

The term "low molecular weight" is employed to designate those aromatic compounds having a molecular weight below about 1000. In other words, film forming polymers, which typically have a molecular weight of at least 5000, are excluded.

Low molecular weight aromatic compounds whose vapor pressure is sufficiently high so that the compound can be vacuum deposited are preferred.

Low molecular weight aromatic compounds are useful in the present invention are solids at room temperature. They preferably have a glass transition temperature of greater than about 50° C. Glass transition temperature is measured using conventional techniques, such as differential scanning calorimetry. The measurement should be taken from amorphous bulk material that is substantially free from residual solvents and decomposition products since that is the condition of the materials when they are vacuum coated.

The low molecular weight aromatic compounds contain at least one aromatic carbocyclic or heterocyclic ring. In a preferred form the compounds can be the "multicyclic aromatic nucleus" compounds described in U.S. Pat. No. 4,499,165 or derivatives thereof.

A "multicyclic aromatic nucleus" is a nucleus comprising at least two cyclic groups one of which is aromatic, including aromatic heterocyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole oxazole, imide, pyrazole, triazole, oxadiazole, pyridine, pyrimidine, pyrazine, triazine, tetrazine and quinoline groups. The substituents are fused or non-fused and mono or polycyclic. Examples of multicyclic aromatic nuclei include 9,9-bis(4-hydroxy-3,5-dichlorophenyl)fluorene, 4,4'-hexahydro-4,7-methanoindan-5-ylidenebis(2,6-dichlorophenol); 9,9-bis(4-hydroxy-3,5-dibromophenyl)fluorene, 4,4'-hexahydro-4,7-methanoindan-5-ylidenebis(2,6-dibromophenol); 3',3",5',5"-tetrabromophenolphthalein, 9,9-bis(4-aminophenyl)fluorene, phenylindandiols; 1,1'-spirobiindandiols, 1,1'-spirobiindandiamines, 2,2'-spirobichromans; 7,7-dimethyl-7H-dibenzo[c,h]xanthenediol; 9,9-dimethylxanthene-3,6-bis(oxyacetic acids); 4,4'-(3-phenyl-1-indanylidene)diphenol and other bisphenols; 9-phenyl-3-oxo-2,6,7-trihydroxyxanthene; and the like.

Useful multicyclic aromatic nuclei compounds are:

A. The phenylindan diols disclosed in *Research Disclosure*, Item No. 11833, February 1974, and U.S. Pat. Nos. 3,803,096, 3,859,364 and 3,886,124 and the phenylindan diamines of U.S. Pat. Nos. 3,897,253 and 3,915,939, B. The 1,1'-spirobiindan diols and diamines disclosed in U.S. Pat. No. 3,725,070; and the 1,1'-spirobiindan (dicarboxylic acids) of *Research Disclosure*, Item No. 9830, June 1972 (anonymous), C. The 1,1'-spirobiindan-5,5'-diamines disclosed in *Research Disclosure*, Item No. 13117, March 1975, D. The 2,2'-spirobichromans disclosed in U.S. Pat. No. 3,859,097, E. The 7,7-dimethyl-7H-dibenzo[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, June 1972 (anonymous), G. The 4,4'-(3-phenyl-1-indanylidene)diphenols disclosed in *Research Disclosure*, Item No. 13101, March 1975, H. The 4,4'-(hexahydro-4,7-methanoindan-5-ylidene)diphenols disclosed in *Research Disclosure*, Item No. 13568, July 1975, I. The bisphenols disclosed in *Research Disclosure*, Item No. 13569, July 1975, J. The sulfonyldibenzoic acids disclosed in *Research Disclosure*, Item No. 14016, December 1975, K. The polycyclic norbornanes of *Research Disclosure*, Item No. 9207, December 1971, and L. The 1,2,3,4-tetrahydronaphthalenes disclosed in *Research Disclosure*, Item No. 13570, July 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds. Preferred compounds are substituted phenylindan compounds and phthalimide compounds described below.

The phenylindan compounds have the structure:

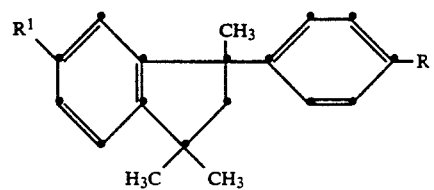

wherein R and $R^1$ are independently selected from the group consisting of nitro, amino, carboxyl, formamido groups, carbamoyl groups and heterocyclic groups derived from amino or carboxyl groups.

Useful formamido and carbamoyl groups are represented by the formulae —NHCOR² and —CONR²R³ respectively, wherein R² and R³ are independently selected from the group consisting of unsubstituted and substituted aliphatic, aromatic and heterocyclic groups such that the molecular weight of the compound is less than about 1000.

Useful aliphatic groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-propenyl and 1-cyclohexenyl.

Useful aromatic groups include phenyl and naphthyl and substituted aromatic such as aromatic substituted with halogen, alkyl, cyano, alkoxy and hydroxy such as 4-methoxy phenyl and 3,4-dichloro phenyl.

Useful heterocyclic groups include pyridyl, furanyl, thiophenyl, quinolyl and piperidyl; and substituted heterocyclic such as heterocyclic substituted with alkyl, halogen and alkoxy such as 5-butylpyridyl.

Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

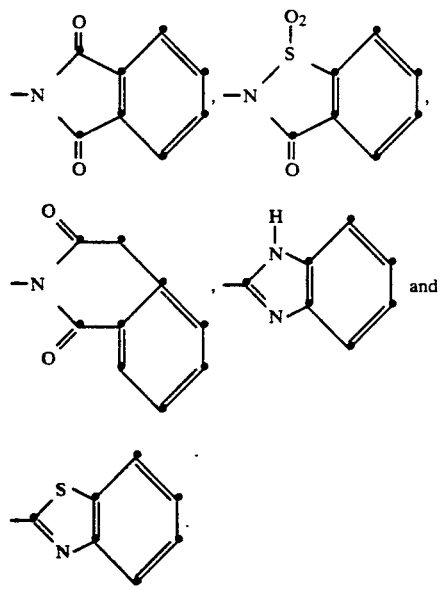

The formamido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane.

The similar carbamoyl compounds are made in a similar manner starting from the phenylindandicarboxylic acid, converting it to the corresponding acid chloride and reacting the acid chloride with the desired amine.

Where R and R¹ are different, mixtures of the side chain precursors are used and the compound isolated by liquid chromotography. In preferred embodiments, there is no need to resolve the mixture as it is useful directly.

Exemplary preferred phenylindan compounds are listed in Table I. All of the refractive indices reported in this table and subsequently were measured at 632 nm.

TABLE I

| Compound | R | Refractive Index | Tg °C. |
|---|---|---|---|
| TEL-1 | —CONH₂ | 1.613 | 110 |
| TEL-2 | —NHCO—C₆H₄—OCH₃ | 1.630 | 114 |
| TEL-3 | —NHCO—C₆H₄—Cl | 1.629 | 118 |
| TEL-4 | —NHCO—C₆H₄—Br | 1.647 | 134 |
| TEL-5 | —NHCO—C₆H₄—CN | 1.677 | 138 |
| TEL-6 | —NHCO—C₆H₅ | 1.634 | 114 |
| TEL-7 | —NHCO—C₆H₃(Cl)(Cl) | 1.649 | 127 |
| TEL-8 | —NHCO—C₆F₅ | 1.548 | 123 |
| TEL-9 | —NHCO—naphthyl | 1.656 | 133 |

TABLE I-continued

R–[structure with CH3, H3C CH3]–R

| Compound | R | Refractive Index | Tg °C. |
|---|---|---|---|
| TEL-10 | —CONH—⟨phenyl⟩—Br | 1.659 | 136 |
| TEL-11 | —NHCO—⟨phenyl⟩ | 1.569 | 150 |
| TEL-12 | —NHCOCH$_2$C(CH$_3$)$_3$ | 1.537 | 112 |
| TEL-13 | —NHCOCH$_2$CH$_2$CH$_3$ | 1.572 | 78 |
| TEL-14 | —NHCOCF$_2$CF$_2$CF$_3$ | 1.472 | 60 |
| TEL-15 | —CON⟨piperidine⟩ | 1.548 | 99 |
| TEL-16 | —CONHC(CH$_3$)(CH$_2$CH$_3$)CH$_3$ | 1.545 | 86 |
| TEL-17 | —N⟨phthalimide with CH$_3$⟩ | 1.660 | 128 |
| TEL-18 | Mixture of —NHCO—⟨phenyl⟩—Br | 1.654 | 121 |

TABLE I-continued

R–[structure with CH3, H3C CH3]–R

| Compound | R | Refractive Index | Tg °C. |
|---|---|---|---|
| | —NHCO—⟨naphthyl⟩, and | | |
| | —NHCO—⟨phenyl⟩—OCH$_3$ | | |

Preferred phthalimide compounds are disclosed by Machiele et al U.S. Ser. No. 273,550, filed Nov. 21, 1988, commonly assigned now abandoned. The phthalimide compounds have the structure:

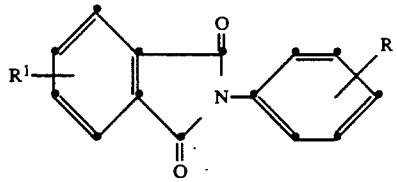

wherein R and R$^1$ are as defined above.

The symmetrically substituted compounds, that is R=R$^1$, are made starting with nitro phthalic anhydride. This is reacted with a nitroaniline to give a dinitro-N-phenyl-phthalimide. This in turn is reduced to the corresponding diamino compound which is then reacted with the oxychloride of the desired side chain.

The similar unsymmetrical compounds are made by reacting the appropriately substituted aniline with the proper nitro-phthalic anhydride followed by reduction to the corresponding amine. The amine is then reacted with the desired acid chloride.

Exemplary phthalimides are listed in Table II.

TABLE II

TEL-19  Br—⟨phenyl⟩—CONH—⟨phthalimide-N-phenyl⟩—NHCO—⟨phenyl⟩—Br    Index: 1.703
(second sample index = 1.705)
mp: > 240°

TEL-20    Index: 1.776

TABLE II-continued
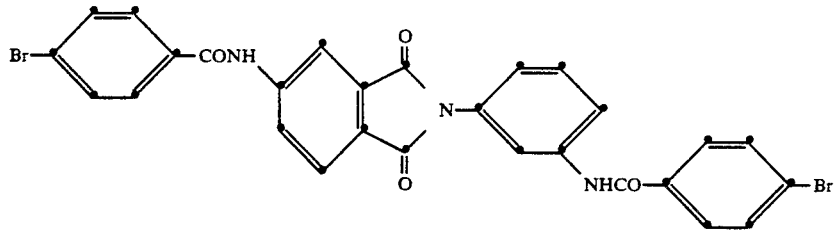
mp: >240°
TEL-21
(CH₃)₃CCH₂CONH
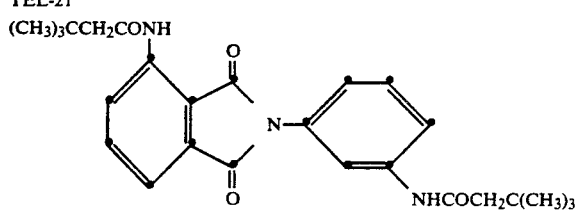
Index: 1.578
mp: 197–200°
TEL-22
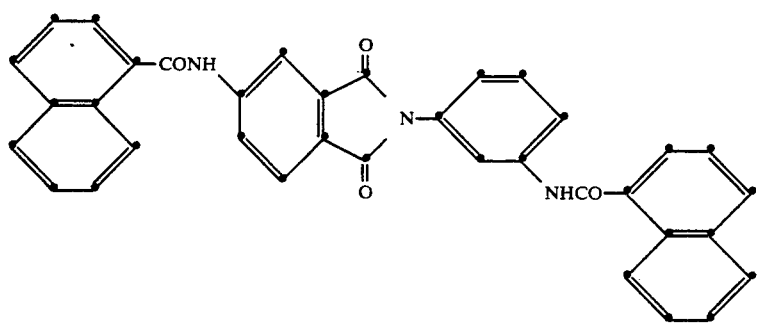
Index: 1.670
mp: >240°
TEL-23
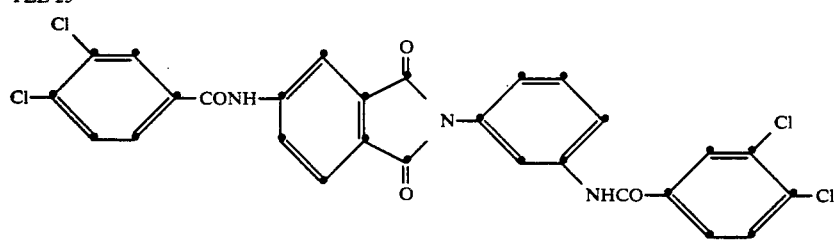
Index: 1.737
mp: >240°
TEL-24
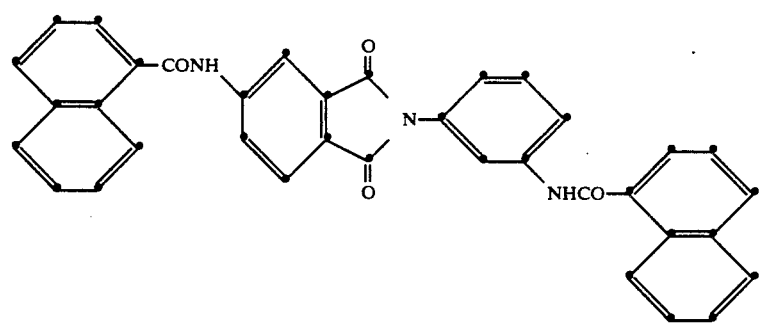
Index: 1.744
(50:50 mixture co-evaporated from sources)
+
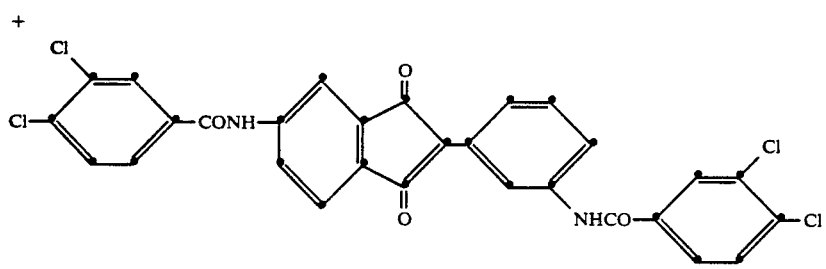
TEL-25
Index: 1.739

TABLE II-continued
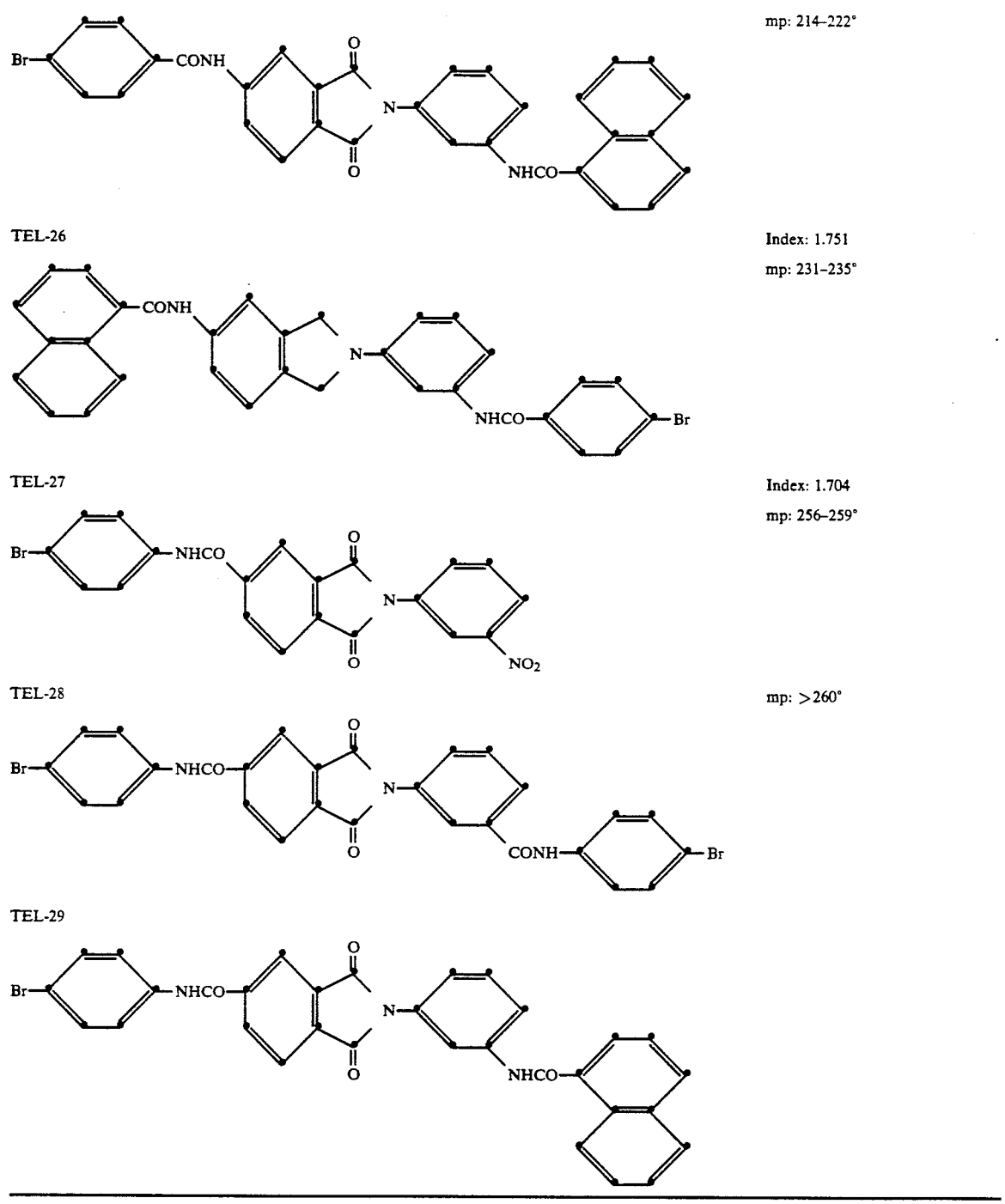
TEL-26    mp: 214–222°
TEL-27    Index: 1.751
          mp: 231–235°
TEL-28    Index: 1.704
          mp: 256–259°
TEL-29    mp: >260°
Still other exemplary low molecular weight aromatic compounds useful as transmission enhancement layers in the practice of this invention are listed in Table III.

TABLE III

| Compound | R | Refractive Index |
|---|---|---|
| TEL-30, -31, -32 (fluorene with two NHR-substituted phenyl groups) | —COCH$_2$C(CH$_3$)$_3$<br>—H<br>—CO—C$_6$H$_4$—Br | 1.599<br>1.701<br>1.708 |
| TEL-33, -34 (structure with Br, OR substituents) | —COCH$_2$C(CH$_3$)$_3$<br>—OH | 1.572<br>1.659 |
| TEL-35, -36, -37 (dimethyl-substituted structure with OR groups) | —COCH$_2$C(CH$_3$)$_3$<br>—H<br>—CO—C$_6$H$_4$—Br | 1.514<br>1.575<br>1.610 |
| TEL-38, -39, -40 (RNH, NHR substituted structure with imide) | —COCH$_2$C(CH$_3$)$_3$<br>—H<br>—CO—C$_6$H$_4$—Br | 1.578<br>1.755<br>1.731 |

Vacuum vapor deposition of the low molecular weight aromatic compounds can be achieved using any convenient conventional vacuum apparatus. A typical vacuum coating apparatus will include a vacuum chamber which is connected to a mechanical vacuum pump which typically provides a pressure as low as about $10^{-3}$ mm Hg. In addition, a diffusion pump is provided to reduce the vacuum further, typically down to about $10^{-6}$ mm Hg. Inside the chamber, there is provided an evaporation source for the material. The container is typically covered, the cover having an opening to direct the flow of material. The substrate to be coated is usually above the container. The uniformity of the coating can be improved by increasing the distance between container and the support.

The dielectric layer coated on the support has a thickness in the range of from 0.1 to 10 (preferably 0.3 to 5) times the wavelength of the electromagnetic radiation.

Metal oxides, metal fluorides, and mixtures of these inorganic materials, hereinafter also referred to as category (a) materials, are preferably used alone for forming first dielectric layers of less than 0.1 μm. When it is preferred to form the dielectric layer of a greater thickness, it is preferred to employ one or a combination of the low molecular weight aromatic compounds described above, hereinafter referred to as category (b) materials. Category (a) materials are more stable and more resistant to solvents than category (b) materials, but have the disadvantage that they do not conveniently form smooth, uniform layers within the highest thickness ranges of the dielectric layer contemplated by the invention. Category (b) materials readily form smooth thicker layers, but with the disadvantages indicated. By employing category (a) and (b) materials in combination it is possible to realize both the greater layer thickness capabilities of category (b) materials and the enhanced stabilities of category (a) materials. It is preferred to employ category (a) and (b) materials in combination in weight ratios of (a):(b) of from 20:80 to 90:10 (preferably 50:50 to 80:20). Blends of category (a) and (b) materials can be readily obtained by concurrent vacuum vapor deposition.

Since the category (a) and (b) materials are both capable of vacuum vapor deposition, formation of different layer thicknesses in the three different zones is readily achieved by simple masking techniques. For example, a stainless steel template with an opening corresponding the zone to be formed can be interposed between the support and the vapor source during deposition. The entire dielectric layer can be formed in three separate steps employing three separate templates or the same template simply repositioned between deposition steps. When the reflective metal layer is formed by vacuum vapor deposition, the different zones of this layer can be formed using the same template or another template after each or all of the zones of the dielectric layer have been formed.

The electrooptic medium 110 forms a layer that varies in its refractive index as a function of the potential gradient to which it is subjected. It can be constructed of any polymeric medium exhibiting a high ($>10^{-9}$ esu) second order polarization susceptibility containing organic molecular dipoles containing an electron donor moiety linked through a conjugated $\pi$ bonding system to an electron acceptor medium. The organic molecular dipole can itself form a part of a polymer as a repeating unit in the polymer backbone or, more commonly, as a pendant group. Alternatively, the organic molecular dipole can be present as a separate compound physically blended with a polymer binder. The polymer portion of the layer can be either a linear or a crosslinked polymer.

A wide variety of organic molecular dipoles suitable for use in the practice of this invention as well as polymers, forming a part of the organic molecular dipoles or employed as separate binders, are known and are exemplified by the following:

NLO-1. Williams, "Organic Polymeric and Non-Polymeric Materials with Large Optical Nonlinearities", *Angew. Chem.* Int. Ed. Engl. 23 (1984), pp. 690-703;

NLO-2. Garito U.S. Pat. No. 4,536,450, issued Aug. 20, 1985;

NLO-3. European Patent Application 0,186,999, published July 9, 1986;

NLO-4. Zyss, "Nonlinear Organic Materials for Integrated Optics", *Journal of Molecular Electronics*, Vol. 1, pp. 25-45;

NLO-5 Choe U.S. Pat. No. 4,603,187, issued July 29, 1986;

NLO-6 Choe et al U.S. Pat. No. 4,707,305, issued Nov. 17, 1987;

NLO-7 Choe et al U.S. Pat. No. 4,667,042, issued May 19, 1987;

NLO-8 Choe et al U.S. Pat. No. 4,650,609, issued Mar. 17, 1987;

NLO-9 Choe U.S. Pat. No. 4,579,915, issued Apr. 1, 1986;

NLO-10 DeMartino U.S. Pat. No. 4,720,355, issued Jan. 19, 1988;

NLO-11 Choe et al U.S. Pat. No. 4,732,783, issued Mar. 22, 1988;

NLO-12 Kobayashi et al, Chemical Physics Letters, Vol. 121, No. 4, 5, pp. 356-360, Nov. 15, 1985;

NLO-13 DeMartino U.S. Pat. No. 4,766,171, issued Aug. 23, 1988;

NLO-14 DeMartino et al U.S. Pat. No. 4,694,066, issued Sept. 15, 1987;

NLO-15 DeMartino et al U.S. Pat. No. 4,835,235, issued May 30, 1989;

NLO-16 Choe U.S. Pat. No. 4,711,532, issued Dec. 8, 1987;

NLO-17 Choe U.S. Pat. No. 4,694,048, issued Sept. 15, 1987;

NLO-18 Choe U.S. Pat. No. 4,703,096, issued Oct. 27, 1987;

NLO-19 Choe U.S. Pat. No. 4,719,28, issued Jan. 12, 1988;

NLO-20 Milverton et al U.S. Pat. No. 4,818,616, issued Apr. 4, 1989;

NLO-21 Leslie et al U.S. Pat. No. 4,796,976, issued Jan. 10, 1989;

NLO-22 Choe U.S. Pat. No. 4,804,255, issued Feb. 14, 1989;

NLO-23 Leslie U.S. Pat. No. 4,801,659, issued Jan. 31, 1989;

NLO-24 Leslie U.S. Pat. No. 4,807,968, issued Feb. 28, 1989;

NLO-25 Teng et al U.S. Pat. No. 4,775,215, issued Oct. 4, 1988;

NLO-26 Robin et al U.S. Pat. No. 4,794,045, issued Dec. 27, 1988;

NLO-27 Gillberg-LaForce et al U.S. Pat. No. 4,728,576, issued Mar. 1, 1988;

NLO-28 DeMartino U.S. Pat. No. 4,779,961, issued Oct. 25, 1988;

NLO-29 DeMartino U.S. Pat. No. 4,757,130, issued July 22, 1988;

NLO-30 Choe U.S. Pat. No. 4,824,219, issued Apr. 25, 1989;

NLO-31 Ulman et al U.S. Pat. No. 4,792,208, issued Dec. 20, 1988;

NLO-32 DeMartino et al U.S. Pat. No. 4,808,332, issued Feb. 28, 1989;

NLO-33 Robello et al U.S. Pat. No. 4,796,971, issued Jan. 10, 1989;

NLO-34 DeMartino et al U.S. Pat. No. 4,822,865, issued Apr. 18, 1989;

NLO-35 DeMartino et al U.S. Pat. No. 4,801,670, issued Jan. 31, 1989;

NLO-36 Robello U.S. Pat. No. 4,900,127, issued Feb. 13, 1990;

NLO-37 Scozzafava et al U.S. Pat. No. 4,886,339, issued Dec. 12, 1981.

Specifically preferred organic nonlinear optical layers are those which can be formed by poling linear condensation and vinyl polymers including noncentrosymmetric molecular dipoles as pendant or backbone groups. The molecular dipoles include an electron donor moiety, such as an amino, oxy, or thio group, linked through a conjugated $\pi$ bonding system to an electron acceptor moiety, such as a sulfonyl, cyano, or nitro group, to permit oscillation of the molecular dipole between a lower polarity ground state and a higher polarity excited state. A preferred conjugated $\pi$ bonding system is provided by a 4,4'-stilbene or 4,4'-diazobenzene linkage between the electron acceptor or electron donor moiety. The molecular dipole can be immobilized by a separate crosslinked polymeric binder, as illustrated by NLO-37; as linked to the polymer backbone through the electron donor or acceptor moiety, as illustrated by NLO-31; or incorporated in the polymer backbone by linkages through both the electron acceptor and donor moieties, as illustrated bu NLO-36.

The following are illustrative of preferred molecular dipole monomers suitable for producing condensation polymers that can be poled to form the nonlinear optical layers:

Table IV

NOCM-1 4'-{N-[5-(Methoxycarbonyl)pentyl]-N-methylamino}-4-(6-hydroxyhexyl)sulfonylazobenzene NOCM-2 4'-{N-[5-(Butoxycarbonyl)pentyl]-N-methylamino}-4-(6-hydroxyhexyl)sulfonylazobenzene NOCM-3 4'-{N-[5-(Methoxycarbonyl)pentyl]-N-methylamino}-4-(6-hydroxyhexyl)sulfonylstilbene NOCM-4 4'-{N-[5-(Butoxycarbonyl)pentyl]-N-methylamino}-4-(6-hydroxyhexyl)sulfonylstilbene NOCM-5 4'-[N-(Methoxycarbonyl)methyl-N-methylamino]-4-(6-hydroxyhexyl)sulfonylazobenzene NOCM-6 4'-[N-(Ethoxycarbonyl)methyl-N-methylamino]-4-(6-hydroxyhexyl)sulfonylazobenzene NOCM-7 4'-[N-(Methoxycarbonyl)methyl-N-methylamino]-4-(6-hydroxyhexyl)sulfonylstilbene NOCM-8 4'-[N-(Ethoxycarbonyl)methyl-N-methylamino]-4-(6-hydroxyhexyl)sulfonylstilbene NOCM-9 4'-[N-(6-Hydroxyhexyl)-N-methylamino]-4-[2-(methoxycarbonyl)ethyl]sulfonylazobenzene NOCM-10 4'-[N-(6-Hydroxyhexyl)-N-methylamino]-4-[2-(ethoxycarbonyl)ethyl]sulfonylazobenzene NOCM-11 4'-[N-(6-Hydroxyhexyl)-N-methylamino]-4-[2-(methoxycarbonyl)ethyl]sulfonylstilbene NOCM-12 4'-[N-(6-Hydroxyhexyl)-N-methylamino]-4-[2-(ethoxycarbonyl)ethyl]sulfonylstilbene NOCM-13 4'-[N-(2-Hydroxyethyl)-N-methylamino]-4-[2-(methoxycarbonyl)ethyl]sulfonylazobenzene NOCM-14 4'-[N-(2-Hydroxyethyl)-N-methylamino]-4-[2-(ethoxycarbonyl)ethyl]sulfonylazobenzene NOCM-15 4'-[N-(2-Hydroxyethyl)-N-methylamino]-4-[2-(methoxycarbonyl)ethyl]sulfonylstilbene NOCM-16 4'-[N-(2-Hydroxyethyl)-N-methylamino]-4-[2-(ethoxycarbonyl)ethyl]sulfonylstilbene NOCM-17 4'-[N-(2-Hydroxyhexyl)-N-methylamino]-4-[5-(methoxycarbonyl)pentyl]sulfonylazobenzene NOCM-18 4'-[N-(2-Hydroxyhexyl)-N-methylamino]-4-[5-(methoxycarbonyl)pentyl]sulfonylstilbene NOCM-19 4'-(4-Hydroxy-1-piperidinyl)-4-[2-(methoxycarbonyl)ethyl]sulfonylazobenzene NOCM-20 4'-(4-Hydroxy-1-piperidinyl)-4-[2-(methoxycarbonyl)ethyl]sulfonylstilbene The following are illustrative of preferred molecular dipole monomers suitable for producing vinyl polymers that can be poled to form the nonlinear optical layers:

Table V

NOVM-1 4'-[N-(2-acryloyloxyethyl-N-methylamino]-4-methylsulfonylstilbene

NOVM-2 4'-[N-(2-methacryloyloxyethyl-N-methylamino]-4-methylsulfonylstilbene

NOVM-3 4'-[N-(6-acryloyloxyhexyl)-N-methylamino]-4-methylsulfonylstilbene

NOVM-4 4'-[N-(6-methacryloyloxyhexyl)-N-methylamino]-4-methylsulfonylstilbene

NOVM-5 4'-[4-acryloyloxy-1-piperidyl]-4-methylsulfonylstilbene

NOVM-6 4'-[4-methacryloyloxy-1-piperidyl]-4-methylsulfonylstilbene

NOVM-7 4'-[N-(2-acryloyloxyethyl)-N-methylamino]-4-phenylsulfonylstilbene

NOVM-8 4'-[N-(2-methacryloyloxyethyl)-N-methylamino]-4-phenylsulfonylstilbene

NOVM-9 4'-[N-(6-acryloyloxyhexyl)-N-methylamino]-4-phenylsulfonylstilbene

NOVM-10 4'-[N-(6-methacryloyloxyhexyl)-N-methylamino]-4-phenylsulfonylstilbene

NOVM-11 4'-[4-acryloyloxy-1-piperidyl]-4-phenylsulfonylstilbene

NOVM-12 4'-[4-methacryloyloxy-1-piperidyl]-4-phenylsulfonylstilbene

NOVM-13 4'-[N-(2-acryloyloxyethyl)-N-methylamino]-4-(R-2-methylbutyl)sulfonylstilbene NOVM-14 4'-[N-(2-methacryloyloxyethyl)-N-methylamino]-4-(R-2-methylbutyl)sulfonylstilbene NOVM-15 4'-[N-(6-acryloyloxyethyl)-N-methylamino]-4-(R-2-methylbutyl)sulfonylstilbene NOVM-16 4'-[N-(6-methacryloyloxyethyl)-N-methylamino]-4-(R-2-methylbutyl)sulfonylstilbene NOVM-17 4'-[4-acryloyloxy-1-piperidyl]-4-(R-2-methylbutyl)sulfonylstilbene NOVM-18 4'-[4-methacryloyloxy-1-piperidyl]-4-(R-2-methylbutyl)sulfonylstilbene NOVM-19 4'-(2-acryloyloxyethoxy)-4-methylsulfonylstilbene NOVM-20 4'-(2-methacryloyloxyethoxy)-4-methylsulfonylstilbene NOVM-21 4'-(6-acryloyloxyhexoxy)-4-methylsulfonylstilbene NOVM-22 4'-(6-methacryloyloxyhexoxy)-4-methylsulfonylstilbene NOVM-23 4'-(2-acryloyloxyethoxy)-4-phenylsulfonylstilbene NOVM-24 4'-(2-methacryloyloxyethoxy)-4-phenylsulfonylstilbene NOVM-25 4'-(6-acryloyloxyhexoxy)-4-phenylsulfonylstilbene NOVM-26 4'-(6-methacryloyloxyhexoxy)-4-phenylsulfonylstilbene NOVM-27 4'-(2-acryloyloxyethoxy)-4-(R-2-methylbutyl)sulfonylstilbene NOVM-28 4'-(2-methacryloyloxyethoxy)-4-(R-2-methylbutyl)sulfonylstilbene NOVM-29 4'-(6-acryloyloxyhexoxy)-4-(R-2-methylbutyl)sulfonylstilbene NOVM-30 4'-(6-methacryloyloxyhexoxy)-4-(R-2-methylbutyl)sulfonylstilbene NOVM-31 4'-(2-acryloyloxyethylthio)-4-methylsulfonylstilbene NOVM-32 4'-(2-methacryloyloxyethylthio)-4-methylsulfonylstilbene NOVM-33 4'-(6-acryloyloxyhexylthio)-4-methylsulfonylstilbene NOVM-34 4'-(6-methacryloyloxyhexylthio)-4-methylsulfonylstilbene NOVM-35 4'-(2-acryloyloxyethylthio)-4-phenylsulfonylstilbene NOVM-36 4'-(2-methacryloyloxyethylthio)-4-phenylsulfonylstilbene NOVM-37 4'-(6-acryloyloxyhexylthio)-4-phenylsulfonylstilbene NOVM-38 4'-(6-methacryloyloxyhexylthio)-4-phenylsulfonylstilbene NOVM-39 4'-(2-acryloyloxyethylthio)-4-(R-2-methylbutyl)sulfonylstilbene NOVM-40 4'-(2-methacryloyloxyethylthio)-4-(R-2-methylbutyl)sulfonylstilbene
NOVM-41 4'-(6-acryloyloxyhexylthio-4-(R-2-methylbutyl)sulfonylstilbene
NOVM-42 4'-(6-methacryloyloxyhexylthio-4-(R-2-methylbutyl)sulfonylstilbene
NOVM-43 4'-dimethylamino-4-(6-acryloyloxyhexyl)sulfonylstilbene
NOVM-44 4'-dimethylamino-4-(6-methacryloyloxyhexyl)sulfonylstilbene
NOVM-45 4'-(1-pyrrolidino)-4-(6-acryloyloxyhexyl)sulfonylstilbene
NOVM-46 4'-(1-pyrrolidino)-4-(6-methacryloyloxyhexyl)sulfonylstilbene
NOVM-47 4'-[N-(R-2-methylbutyl)-N-methylamino]-4-(6-acryloyloxyhexyl)sulfonylstilbene
NOVM-48 4'-[N-(R-2-methylbutyl)-N-methylamino]-4-(6-methacryloyloxyhexyl)sulfonylstilbene
NOVM-49 4'-methoxy-4-(6-acryloyloxyhexyl)sulfonylstilbene
NOVM-50 4'-methoxy-4-(6-methacryloyloxyhexyl)sulfonylstilbene
NOVM-51 4'(R-2-methylbutoxy)-4-(6-acryloyloxyhexyl)sulfonylstilbene
NOVM-52 4'(R-2-methylbutoxy)-4-(6-methacryloyloxyhexyl)sulfonylstilbene
NOVM-53 4'-methylthio-4-(6-acryloyloxyhexyl)sulfonylstilbene
NOVM-54 4'-methylthio-4-(6-methacryloyloxyhexyl)sulfonylstilbene
NOVM-55 4'-(R-2-methylbutylthio)-4-(6-acryloyloxyhexyl)sulfonylstilbene
NOVM-56 4'-(R-2-methylbutylthio)-4-(6-methacryloyloxyhexyl)sulfonylstilbene
NOVM-57 4'-[N-(2-acryloyloxyethyl)-N-methylamino]-4-methylsulfonylazobenzene
NOVM-58 4'-[N-(2-methacryloyloxyethyl)-N-methylamino]-4-methylsulfonylazobenzene
NOVM-59 4'-[N-(6-acryloyloxyhexyl)-N-methylamino]-4-methylsulfonylazobenzene
NOVM-60 4'[N-(6-methacryloyloxyhexyl)-N-methylamino]-4-methylsulfonylazobenzene
NOVM-61 4'-[4-acryloyloxy-1-piperidyl]-4-methylsulfonylazobenzene
NOVM-62 4'-[4-methacryloyloxy-1-piperidyl]-4-methylsulfonylazobenzene
NOVM-63 4'-[N-(2-acryloyloxyethyl)-N-methylamino]-4-phenylsulfonylazobenzene
NOVM-64 4'-[N-(2-methacryloyloxyethyl)-N-methylamino]-4-phenylsulfonylazobenzene
NOVM-65 4'-[N-(6-acryloyloxyhexyl)-N-methylamino]-4-phenylsulfonylazobenzene
NOVM-66 4'-[N-(6-methacryloyloxyhexyl)-N-methylamino]-4-phenylsulfonylazobenzene
NOVM-67 4'-[4-acryloyloxy-1-piperidyl]-4-phenylsulfonylazobenzene
NOVM-68 4'-[4-methacryloyloxy-1-piperidyl]-4-phenylsulfonylazobenzene
NOVM-69 4'-[N-(2-acryloyloxyethyl)-N-methylamino]-4-(R-2-methylbutyl)sulfonylazobenzene
NOVM-70 4'-[N-(2-methacryloyloxyethyl)-N-methylamino]-4-(R-2-methylbutyl)sulfonylazobenzene
NOVM-71 4'-[N-(6-acryloyloxyhexyl)-N-methylamino]-4-(R-2-methylbutyl)sulfonylazobenzene
NOVM-72 4'-[N-(6-methacryloyloxyhexyl)-N-methylamino]-4-(R-2-methylbutyl)sulfonylazobenzene
NOVM-73 4'-[4-acryloyloxy-1-piperidyl]-4-(R-2-methylbutyl)sulfonylazobenzene
NOVM-74 4'-[4-methacryloyloxy-1-piperidyl]-4-(R-2-methylbutyl)sulfonylazobenzene
NOVM-75 4'-(2-acryloyloxyethoxy)-4-methylsulfonylazobenzene
NOVM-76 4'-(2-methacryloyloxyethoxy)-4-methylsulfonylazobenzene
NOVM-77 4'-(6-acryloyloxyhexoxy)-4-methylsulfonylazobenzene
NOVM-78 4'-(6-methacryloyloxyhexoxy)-4-methylsulfonylazobenzene
NOVM-79 4'-(2-acryloyloxyethoxy)-4-phenylsulfonylazobenzene
NOVM-80 4'-(2-methacryloyloxyethoxy)-4-phenylsulfonylazobenzene
NOVM-81 4'-(6-acryloyloxyhexoxy)-4-phenylsulfonylazobenzene
NOVM-82 4'-(6-methacryloyloxyhexoxy)-4-phenylsulfonylazobenzene
NOVM-83 4'-(2-acryloyloxyethoxy)-4-(R-2-methylbutyl)sulfonylazobenzene
NOVM-84 4'-(2-methacryloyloxyethoxy)-4-(R-2-methylbutyl)sulfonylazobenzene
NOVM-85 4'-(6-acryloyloxyhexoxy)-4-(R-2-methylbutyl)sulfonylazobenzene
NOVM-86 4'-(6-methacryloyloxyhexoxy)-4-(R-2-methylbutyl)sulfonylazobenzene
NOVM-87 4'-(2-acryloyloxyethylthio)-4-methylsulfonylazobenzene
NOVM-88 4'-(2-methacryloyloxyethylthio)-4-methylsulfonylazobenzene
NOVM-89 4'-(6-acryloyloxyhexylthio)-4-methylsulfonylazobenzene
NOVM-90 4'-(6-methacryloyloxyhexylthio)-4-methylsulfonylazobenzene
NOVM-91 4'-(2-acryloyloxyethylthio)-4-phenylsulfonylazobenzene
NOVM-92 4'-(2-methacryloyloxyethylthio)-4-phenylsulfonylazobenzene
NOVM-93 4'-(6-acryloyloxyhexylthio)-4-phenylsulfonylazobenzene
NOVM-94 4'-(6-methacryloyloxyhexylthio)-4-phenylsulfonylazobenzene
NOVM-95 4'-(2-acryloyloxyethylthio)-4-(R-2-methylbutyl)sulfonylazobenzene
NOVM-96 4'-(2-methacryloyloxyethylthio)-4-(R-2-methylbutyl)sulfonylazobenzene
NOVM-97 4'-(6-acryloyloxyhexylthio)-4-(R-2-methylbutyl)sulfonylazobenzene
NOVM-98 4'-(6-methacryloyloxyhexylthio)-4-(R-2-methylbutyl)sulfonylazobenzene
NOVM-99 4'-dimethylamino-4-(2-acryloyloxyethyl)sulfonylazobenzene
NOVM-100 4'-dimethylamino-4-(2-methacryloyloxyethyl)sulfonylazobenzene
NOVM-101 4'-dimethylamino-4-(6-acryloyloxyhexyl)sulfonylazobenzene
NOVM-102 4'-dimethylamino-4-(6-methacryloyloxyhexyl)sulfonylazobenzene
NOVM-103 4'-(1-pyrrolidino)-4-(2-acryloyloxyethyl)sulfonylazobenzene
NOVM-104 4'-(1-pyrrolidino)-4-(2-methacryloyloxyethyl)sulfonylazobenzene NOVM-105 4'-(1-pyrrolidino)-4-(6-acryloyloxyhexyl)-sulfonylazobenzene
NOVM-106 4'-(1-pyrrolidino)-4-(6-methacryloyloxyhexyl)sulfonylazobenzene
NOVM-107 4'-dimethylamino-4-(6-acryloyloxyhexyl)-sulfonylazobenzene
NOVM-108 4'-dimethylamino-4-(6-methacryloyloxyhexyl)sulfonylazobenzene
NOVM-109 4'-(1-pyrrolidino-4-(6-acryloyloxyhexyl)-sulfonylazobenzene
NOVM-110 4'-(1-pyrrolidino-4-(6-methacryloyloxyhexyl)sulfonylazobenzene
NOVM-111 4'[N-(R-2-methylbutyl)-N-methylamino]-4-(6-acryloyloxyhexyl)sulfonylazobenzene
NOVM-112 4'[N-(R-2-methylbutyl)-N-methylamino]-4-(6-methacryloyloxyhexyl)sulfonylazobenzene
NOVM-113 4'-methoxy-4-(6-acryloyloxyhexyl)sulfonylazobenzene
NOVM-114 4'-methoxy-4-(6-methacryloyloxyhexyl)-sulfonylazobenzene
NOVM-115 4'-(R-2-methylbutoxy)-4-(6-acryloxyhexyl)sulfonylazobenzene
NOVM-116 4'-(R-2-methylbutoxy)-4-(6-methacryloxyhexyl)sulfonylazobenzene
NOVM-117 4'-methylthio-4-(6-acryloxyhexyl)sulfonylazobenzene
NOVM-118 4'-methylthio-4-(6-methacryloxyhexyl)sulfonylazobenzene
NOVM-119 4'-(R-2-methylbutylthio)-4-(6-acryloxyhexyl)sulfonylazobenzene
NOVM-120 4'-(R-2-methylbutylthio)-4-(6-acryloxyhexyl)sulfonylazobenzene
NOVM-121 1-(9-julolidinyl)-2-[4-(6-acryloyloxyhexylsulfonyl)phenyl]ethene
NOVM-122 1-(1-butyl-5-indolinyl)-2-[4-(6-methacryloyloxyhexylsulfonyl)phenyl]diimine The following are illustrative of typical vinyl addition monomers that can be copolymerized with the vinyl molecular dipole monomers of Table V, if desired. The vinyl molecular dipole monomers can form 50 to 100 percent of the repeating units of the polymer, with vinyl addition monomers, such as those of Table VI, below, forming the balance of the repeating units of the polymer.

Table VI

VCOM-1 Methyl acrylate
VCOM-2 Ethyl acrylate
VCOM-3 Butyl acrylate
VCOM-4 t-Butyl acrylate
VCOM-5 Methyl chloroacrylate
VCOM-6 Methyl methacrylate
VCOM-7 Ethyl methacrylate
VCOM-8 Butyl methacrylate
VCOM-9 t-Butylmethacrylate
VCOM-10 Styrene
VCOM-11 4-Methylstyrene
VCOM-12 α-Methylstyrene
VCOM-13 4-t-Butylstyrene
VCOM-14 4-Hydroxystyrene
VCOM-15 4-Methoxystyrene
VCOM-16 4-Acetoxystyrene
VCOM-17 2-Vinylnaphthylene
VCOM-18 Acrylonitrile
VCOM-19 Acrylamide
VCOM-20 N-Phenylmaleimide
VCOM-21 N-Vinylpyrrolidone
VCOM-22 Vinylacetate
VCOM-23 Vinylchloride
VCOM-24 Butadiene
VCOM-25 Isoprene
VCOM-26 Chloroprene Conventional details of the construction of the electrooptic medium in the form of a polymeric layer, including layer thickness, are taught in the foregoing NLO citations, the disclosures of which are here incorporated by reference.

The reflective metal layer 105 and the electrode 109 can be formed of any metal or combination of metals conventionally employed to form these layers. Generally metals having at least a moderate (at least 3.5 electron volts) work function are employed.

When the reflective metal layer is a relatively noble metal, preferably a metal having at work function of at least 4.5 electron volts (eV), the high $\chi^{(2)}$ polymeric film can be formed on this layer by any convenient conventional technique. Reflective noble metal layers are particularly suited to use when higher than ambient poling temperatures are employed. For example, it is typical to choose polymeric layers for poling that exhibit a glass transition temperature of at least 50° C. (preferably at least 80° C.). By employing a reflective metal layer having a work function of at least 4.5 eV, it is possible to pole the polymeric layer at a temperature above its glass transition temperature while in direct contact with the reflective metal layer. Illustrative of metals having glass transition temperatures of at least 4.5 eV are tungsten, rhenium, osmium, iridium, platinum, and gold. Of these metals, gold is a particularly preferred metal.

When the reflective metal layer is a moderate (3.5 to 4.5 eV) work function metal any of the above high $\chi^{(2)}$ polymeric film construction techniques can still be employed. However, if the high $\chi^{(2)}$ polymeric film is formed directly on the reflective metal layer, it is preferred to avoid heating to temperatures above 50° C. Further, any solvents associated with the polymeric film during deposition are preferably chosen to exhibit little, if any, capability of oxidizing the moderate work function metal. For example, poled polymeric films which rely on crosslinking at or near ambient temperatures to preserve alignment of organic molecular dipoles are contemplated to be located directly on a moderate work function reflective metal layer.

When a moderate work function reflective metal is employed in combination of poled polymeric film having a glass transition temperature of at least 50° C., it is preferred to interpose a thin (<0.1 μm) protective layer between the reflective metal layer and the polymeric film. With the protective layer present, modulation of the optical articles of the invention is still achieved as described above. When the protective layer is deposited prior to the polymeric film or its reactive precursors, the metal reflective layer is fully protected. Observable levels of protection are realized when the protective layer exhibits thicknesses as low as 10 Å; however, it is generally preferred for the protective layer to exhibit thicknesses in the range of from 100 to 700 Å. Any one or combination of the category (a) metal oxides and fluorides described above can be employed to form the protective layer. The protective layers are the specific subject matter of Rider et al, cited above.

The invention has been described in detail with particular reference to preferred embodiments thereof, but it will be understood that variations and modifications can be effected within the spirit and scope of the invention.

What is claimed is:

1. An optical article capable of modulating the reflection of polarized monochromatic electromagnetic radiation comprising a reflective metal layer having a thickness of less than 0.5 μm, means acting as a support for directing polarized electromagnetic radiation to said reflective metal layer, a dielectric layer interposed between said support and said reflective metal layer having a refractive index less than that of said support and a thickness in the range of from 0.1 to 10 times the wavelength of electromagnetic radiation directed toward said reflective metal layer, an electrooptic medium that exhibits a refractive index which is a function of an applied electrical potential, and characterized in that, to modulate the reflection of polarized monochromatic electromagnetic radiation from differing wavelength sources to produce a multicolor image, said reflective metal layer is divided into a plurality of electrically isolated zones each intended to be addressed by electromagnetic radiation from one of the differing wavelength sources, said dielectric layer is comprised of at least one metal oxide, metal fluoride, or low molecular weight aromatic compound and exhibits a different thickness adjacent each of said zones, said dielectric layer thicknesses adjacent said zones being proportional to the relative wavelengths of the electromagnetic radiation from the sources intended to address each zone, said electrooptic medium is a polymer layer coated on said reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety, said polymeric layer exhibits a refractive index which differs from that of said dielectric layer by less than 20 percent in the absence of an applied electrical potential, said counter electrode is divided into electrically isolated zones, and said article additionally includes means for focusing reflected polarized electromagnetic radiation from each of said zones on a common target area.

2. An optical article according to claim 1 further characterized in that in each zone at least one of said reflective metal layer and said counter electrode is divided into a plurality of laterally spaced segments each capable of being independently electrically addressed.

3. An optical article according to claim 2 further characterized in that said segments form an array of parallel strips having their major axes oriented parallel to the direction of electromagnetic radiation propagation at the interface of the reflective metal layer with the electrooptic medium.

4. An optical article according to claim 3 further characterized in that said optical article additionally includes means for individually controlling the electrical potential of each of said segments.

5. An optical article according to claim 1 further characterized in that said electrooptic medium is a poled polymeric layer having a glass transition temperature of at least 50° C.

6. An optical article according to claim 5 further characterized in that said electrooptic medium is a poled polymeric layer having a glass transition temperature of at least 80° C.

7. An optical article according to claim 5 further characterized in that said reflective metal layer has a thickness in the range of from 100 to 1000 Å and is comprised of at least one metal having a work function in the range of from 2.5 to 4.5 eV and said article additionally includes a protective layer having a thickness of less than 0.1 μm consisting essentially of at least one of a metal oxide and a metal fluoride interposed between said reflective metal layer and said poled polymeric layer.

8. An optical article according to claim 7 further characterized in that said protective layer is comprised of a metal oxide chosen from the group consisting of rare earth oxides, alkaline earth oxides, alumina and silica.

9. An optical article according to claim 7 further characterized in that said protective layer is comprised of a metal fluoride chosen from the group consisting of alkali metal fluorides, alkaline earth fluorides, and rare earth fluorides.

10. An optical article according to claim 1 further characterized in that said electrooptic medium is comprised of a polymer containing organic molecular dipoles within its repeating units.

11. An optical article according to claim 1 further characterized in that said dielectric layer is comprised of a metal oxide.

12. An optical article according to claim 11 further characterized in that said metal oxide is chosen from the group consisting of rare earth oxides, alkaline earth oxides, alumina, and silica.

13. An optical article according to claim 1 further characterized in that said first dielectric layer is comprised of a metal fluoride.

14. An optical article according to claim 13 further characterized in that said metal fluoride is chosen from the group consisting of alkali metal fluorides, alkaline earth fluorides, and rare earth fluorides.

15. An optical article according to claim 14 further characterized in that said metal fluoride is an alkali metal fluoride.

16. An optical article according to claim 15 further characterized in that said alkali metal fluoride is lithium fluoride.

17. An optical article according to claim 14 further characterized in that said metal fluoride is an alkaline earth fluoride.

18. An optical article according to claim 17 further characterized in that said alkaline earth fluoride is magnesium fluoride.

19. An optical article according to claim 1 further characterized in that said first dielectric layer is comprised of a low molecular weight aromatic compound.

20. An optical device according to claim 19, further characterized in that said aromatic compound is a phenylindan compound of the structure:

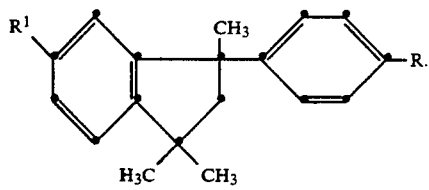

wherein R and $R^1$ are independently selected from the group consisting of nitro, amino, carboxyl, formamido groups, carbamoyl groups and heterocyclic groups derived from amino or carboxyl groups.

21. An optical device according to claim 19, further characterized in that said aromatic compound is a phthalimide compound of the structure:

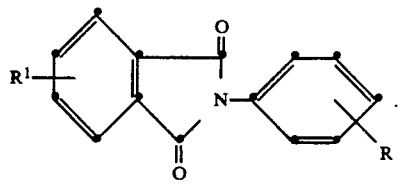

wherein R and $R^1$ are independently selected from the group consisting of nitro, amino, carboxyl, formamido groups, carbamoyl groups and heterocyclic groups derived from amino or carboxyl groups.

22. An optical article according to claim 1 further characterized in that said reflective metal layer is a noble metal layer.

23. An optical article according to claim 22 further characterized in that said noble metal layer is gold.

24. An optical article according to claim 1 further characterized in that said reflective metal layer has a work function in the range of from 3.5 to 4.5 eV.

25. An optical article according to claim 24 further characterized in that said metal is chosen from the group consisting of magnesium, indium, titanium, aluminum, nickel, cobalt, zinc, silver, tin, antimony, bismuth, and mixtures thereof.

26. A process of producing a multicolor image comprising providing a photographic element capable of producing superimposed yellow, magenta and cyan dye images as a function of exposure to electromagnetic radiation in first, second and third wavelength regions, respectively, of the electromagnetic spectrum and imagewise exposing the photographic element to electromagnetic radiation of the first, second and third wavelengths, characterized by the steps of (a) providing an optical article capable of modulating the reflection of polarized monochromatic electromagnetic radiation from differing wavelength sources to produce a multicolor image, comprising a reflective metal layer having a thickness of less than 0.5 μm divided into a plurality of electrically isolated zones each intended to be addressed by electromagnetic radiation from one of the differing wavelength sources, said reflective metal layer being divided into a plurality of electrically isolated zones each intended to be addressed by electromagnetic radiation from one of the differing wavelength sources, means acting as a support for directing polarized electromagnetic radiation to said reflective metal layer, a dielectric layer interposed between said support and said reflective metal layer having a refractive index less than that of said support and a thickness in the range of from 0.1 to 10 times the wavelength of electromagnetic radiation directed toward said reflective metal layer, said dielectric layer being comprised of at least one metal oxide, metal fluoride, or low molecular weight aromatic compound and exhibiting a different thickness adjacent each of said zones, said dielectric layer thicknesses adjacent said zones being proportional to the relative wavelengths of the electromagnetic radiation from the sources intended to address each zone, an electrooptic medium that exhibits a refractive index which is a function of an applied electrical potential, said electrooptic medium consisting of a polymer layer coated on said reflective metal layer and exhibiting a second order polarization susceptibility greater than $10^{-9}$ electrostatic units and comprised of polar aligned molecular dipoles having an electron donor moiety linked through a conjugated $\pi$ bonding system to an electron acceptor moiety, said polymeric layer exhibiting a refractive index which differs from that of said dielectric layer by less than 20 percent in the absence of an applied electrical potential, a counter electrode divided into electrically isolated zones, and means for focusing reflected polarized electromagnetic radiation from each of said zones on a common target area, (b) directing polarized monochromatic electromagnetic radiation of the first, second and third wavelengths to first, second and third zones of the optical article with an electrical potential applied within each zone capable of modulating reflection from that zone, (c) reflecting the electromagnetic radiation of the first, second and third wavelengths from the zones of the article to a common area of the photographic element, and (d) repeating steps (b) and (c) with the potentials applied being independently adjusted during each iteration and the electromagnetic radiation being directed to a different area of the photographic element.

* * * * *